(12) United States Patent
Fiedler et al.

(10) Patent No.: US 12,471,932 B2
(45) Date of Patent: Nov. 18, 2025

(54) MILLING CUTTER FOR ORTHOPAEDIC USE, IN PARTICULAR IN KNEE, PELVIS OR ANKLE SURGERY

(71) Applicant: LIMACORPORATE S.P.A., Villanova di San Daniele del Friuli (IT)

(72) Inventors: Christoph Fiedler, Diekhof (DE); Massimo Ceconi, Travesio (IT)

(73) Assignee: LIMACORPORATE S.P.A., Villanova di San Daniele del Friuli (IT)

( * ) Notice: Subject to any disclaimer, the term of this patent is extended or adjusted under 35 U.S.C. 154(b) by 799 days.

(21) Appl. No.: 17/725,456

(22) Filed: Apr. 20, 2022

(65) Prior Publication Data

US 2022/0240950 A1 Aug. 4, 2022

Related U.S. Application Data

(63) Continuation of application No. PCT/EP2021/065296, filed on Jun. 8, 2021.

(30) Foreign Application Priority Data

Jun. 8, 2020 (IT) .................. 102020000013591

(51) Int. Cl.
*A61B 17/16* (2006.01)
*A61B 17/00* (2006.01)

(52) U.S. Cl.
CPC ...... *A61B 17/1617* (2013.01); *A61B 17/1628* (2013.01); *A61B 17/1633* (2013.01); *A61B 2017/00738* (2013.01); *A61B 2017/00845* (2013.01); *A61B 2017/1602* (2013.01)

(58) Field of Classification Search
CPC ............ A61B 17/1617; A61B 17/1628; A61B 17/1633; A61B 2017/00738; A61B 2017/00845; A61B 2017/1602
See application file for complete search history.

(56) References Cited

U.S. PATENT DOCUMENTS 6,183,478 B1 * 2/2001 Konieczynski .... A61B 17/8891
606/104
7,131,974 B2 * 11/2006 Keyer ................ A61B 17/1622
606/96

(Continued)

FOREIGN PATENT DOCUMENTS

JP         H01146537 A      6/1989
WO    WO-2018033788 A1 *  2/2018  ......... A61B 17/1624

*Primary Examiner* — Kevin T Truong
*Assistant Examiner* — Diana Jones
(74) *Attorney, Agent, or Firm* — Eversheds Sutherland (US) LLP

(57) ABSTRACT

An orthopaedic surgical instrument, in particular a milling cutter, including: an inner rod extended along an own longitudinal axis and provided with an attachment end to a motorized member; a tubular envelope wrapping the inner rod; an operating head at a rod end which is opposite said attachment end; a gimbal joint between the rod end and a tool of said operating head such that said tool is extended along an angled axis with respect to the longitudinal axis. The milling cutter according to the invention improves the precision of execution of the positions of the holes in any surgical operation with anatomy which is difficult to get access to, such as in knee, pelvis and ankle.

18 Claims, 10 Drawing Sheets

(56) References Cited

U.S. PATENT DOCUMENTS

| | | | | |
|---|---|---|---|---|
| 2003/0233098 A1* | 12/2003 | Markworth | ............ | A61B 17/17 |
| | | | | 606/96 |
| 2015/0335335 A1* | 11/2015 | Weekes | .............. | A61B 17/1666 |
| | | | | 606/81 |
| 2017/0071609 A1* | 3/2017 | Phillips | .............. | A61B 17/1631 |

* cited by examiner

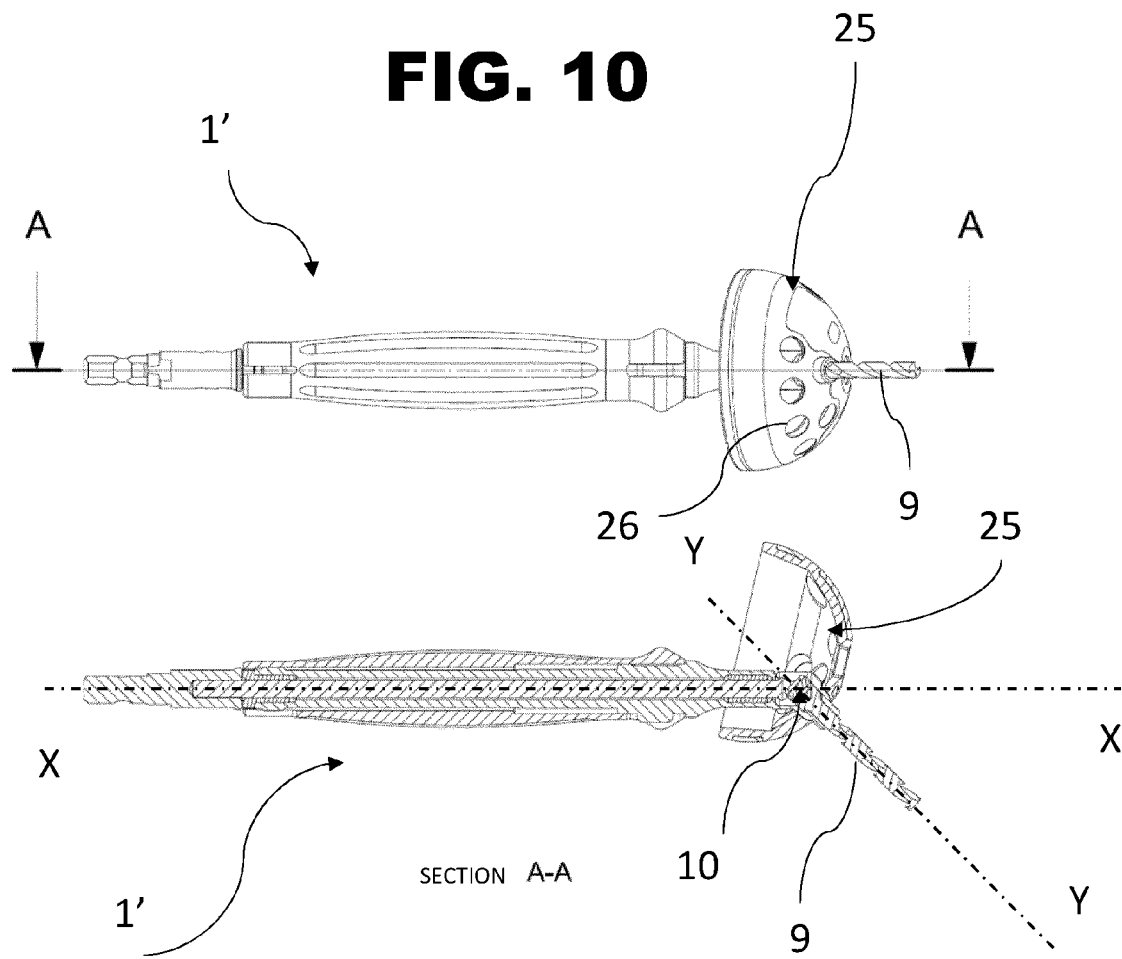

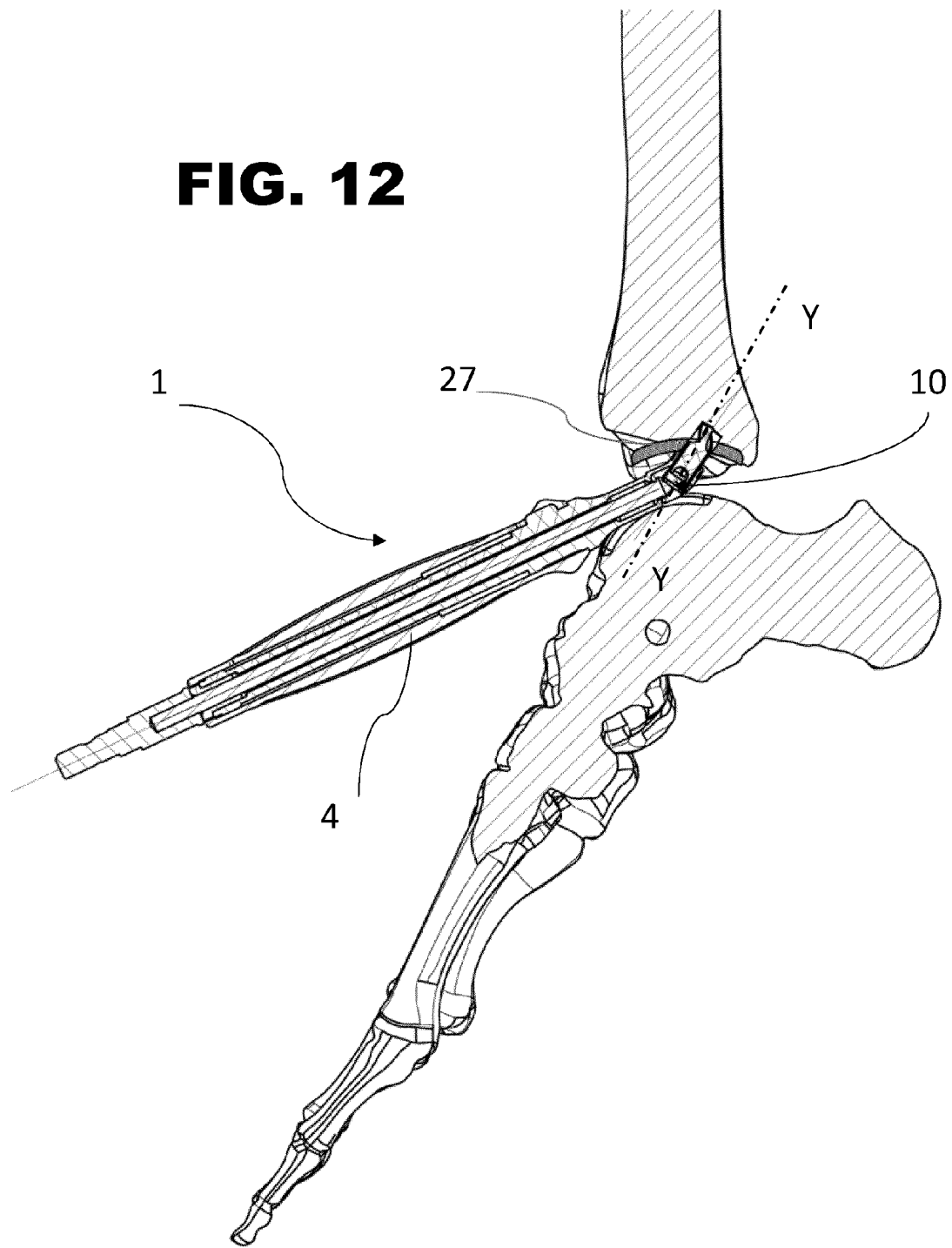

MILLING CUTTER FOR ORTHOPAEDIC USE, IN PARTICULAR IN KNEE, PELVIS OR ANKLE SURGERY

RELATED APPLICATIONS

The present application is a Continuation Application of Int. Pat. App. No. PCT/EP2021/065296, filed Jun. 8, 2021, which claims priority to Italian Pat. App. No. 102020000013591, filed Jun. 8, 2020 and entitled "Improved Milling Cutter for Orthopaedic Use, in Particular in Knee, Pelvis or Ankle Surgery", the entire disclosures of which are all hereby incorporated herein by reference.

TECHNICAL FIELD

The present invention refers to an orthopaedic surgical instrument and, more in particular, to an improved milling cutter which can be used in the knee, pelvis or ankle surgery, and the description about these specific applications is made in order to simplify the exposition thereof but it must not represent a limitation of the Applicant's rights.

More specifically, the invention refers to an instrument for treating a human tibia bone and for performing incisions or millings preparing to other operational stages to be performed on a predetermined portion of the tibia with very limited access. The instrument of the present disclosure can be however used in other types of surgical operations, such as for example operations on the acetabular cup of the pelvis or for treatments of the ankle.

BACKGROUND

It is known that due to aging, diseases or sports activities, the articulation surfaces of the knee can deteriorate and develop pathologies.

Similarly, other bones can deform over time or develop pathologies that must be surgically treated with appropriate instruments.

For example, in the case of the knee, it has become common to perform surgery by removing the condyles and by substituting these bone structures with prosthetic implants. Also the articulation surfaces of the patella can be replaced, being very careful not to touch or incise the tendons connected to the patella.

A relatively common operation according to some operation strategies of this technical sector is the replacing of the back or inner side of the patella, adjacent to the femoral condyles, by implantation of a prosthesis. For this purpose, the back surface of the patella is resected to produce a flat surface over which the prosthesis can be mounted.

FIG. 1 schematically shows a lateral view of a mono-compartmental surgery operation, for example a milling, which involves the articulation of a knee and in which the distal portion of the femur and the proximal portion of the tibia can be seen.

The image schematically shows the position of the femur and of the tibia which can be typically reached during a mono-compartmental operation and it can be understood that the femur covers a part of the tibia, making an access particularly difficult. Essentially, the incision area is much smaller than the one available for a total prosthesis surgery.

Furthermore, the ligaments and soft tissues are generally in a better state, but this involves that the femur cannot be moved that much and certainly much less than in the total prosthesis surgery due to the holding of both cruciate ligaments (front and back) and the not dislocated kneecap.

All this concretely means that the preparation of the proximal part of the tibia cannot be performed from above due to the proximity of the distal part of the femur, but must be performed in a frontal upper mode, that is, in an uncomfortable position for positioning the instruments.

The preparation of the tibia for implanting a stability element, such as for example a mono-compartmental plate, a pin or the like, is usually performed with a milling cutter tip arranged in an inclined way; however, this involves a greater removal of bone, which is filled with a bone cement.

FIG. 2 shows a schematic view illustrating this situation where a 9 mm milling cutter tip is used to create a seat of a stability element with a diameter of only 6.2 mm.

This solution has two clear disadvantages:
an increased removal of bone tissue;
a surprisingly lower tightness of the cement, as the tightness of the cement is optimal with a limited thickness of about 1 mm around the pin. On the contrary, a distribution of the cement is not uniform and with a thickness ranging from 0.5 mm to 2.5 mm gives less adherence.

There are also technical solutions in which the milling cutter tip is mounted on a gimbal joint at one end of a surgical instrument to allow the axis of action of the milling cutter to be angled, for example as described in European application no. EP 1 410 763 A1 or no. EP 2 954 860 A2. However, these solutions are structurally complex and not appropriate for knee operations.

The object of the present invention is to devise an orthopaedic surgical instrument, in particular an improved milling cutter, which has structural and functional characteristics such as to overcome the drawbacks reported with reference to the solutions of the prior art.

Another object of the invention is to devise an instrument which allows a preparation of the operation seat on the knee in axis with a front access in order to avoid interfering with the distal portion of the femur.

Further object of the present invention is to prevent the surgeon from relying only on his manual and visual ability to handle the instrument, but to allow him to operate in a comfortable and practical manner thanks to the configuration of the instrument itself.

Still another object of the invention is to provide an instrument which is easy to handle and use by the orthopaedic surgeon and which does not obstruct the surgeon's view during the operation.

Finally, the instrument of the present invention should be easy to remove and reassemble in order to guarantee cleaning, sanitization and reuse of the instrument.

SUMMARY

The solution idea underlying the invention is to devise a milling cutter having an angled operating head with respect to a longitudinal axis of the instrument but with a particularly simple and functional overall structure.

The objects listed above are achieved by an orthopaedic surgical instrument and, more particularly, by an improved milling cutter, including:
an inner rod having a longitudinal axis and with one end structured to be coupled to a motorized member;
a tubular envelope wrapping the inner rod and structured with two overlapped half-shells covered by a handle;
an angled operating head including a tool;
a gimbal joint provided between the rod end and the tool of said operating head;

an anti-rotation element provided in one of the overlapping half-shells for performing an anti-rotation function holding in position the handle wrapping both half-shells.

Advantageously, the tubular envelope is structured with two overlapped half-shells covered by a handle.

Furthermore, the inner rod is idle with respect to the tubular envelope such that it can rotate under the action of the motorized member while the surgeon holds the instrument.

At least one pair of bushes mounted in an idle manner on opposite parts of said inner rod is provided for supporting the tubular envelope.

The bushes are made of a low-friction synthetic material, for example PEEK.

Furthermore, the end of one of the two half-shells comprises a hosting seat for housing the gimbal joint of the operating head. Such hosting seat has an annular portion having an axis corresponding with the above-mentioned angled axis (Y-Y).

Any anti-rotation element, for example an anti-rotation projecting notch, is provided on at least one of the two half-shells for holding the handle wrapping both half-shells of the tubular envelope.

It should be finally noted that the gimbal joint has one part corresponding to the rod end of the operating head and another part, for example a perforating or milling tip.

A selected embodiment will now be described in detail with reference to the drawings. It will be clear from this disclosure, to those skilled in the art of orthopaedics that the following description of the preferred embodiment is provided only for illustrative purposes and not for the purpose of limiting the invention as defined by the attached claims.

BRIEF DESCRIPTION OF THE DRAWINGS

FIG. 10 shows a lateral schematic view of another embodiment example of the instrument according to the invention, in particular for use in the region of the hip;

FIG. 11 shows a schematic lateral sectional view according to line A-A of the instrument of FIG. 10;

FIGS. 12 and 13 show respective schematic sectional views on a vertical plane of examples of application of the instrument according to the invention in the surgical treatment of the articulation of the ankle.

DETAILED DESCRIPTION

Figure 1:
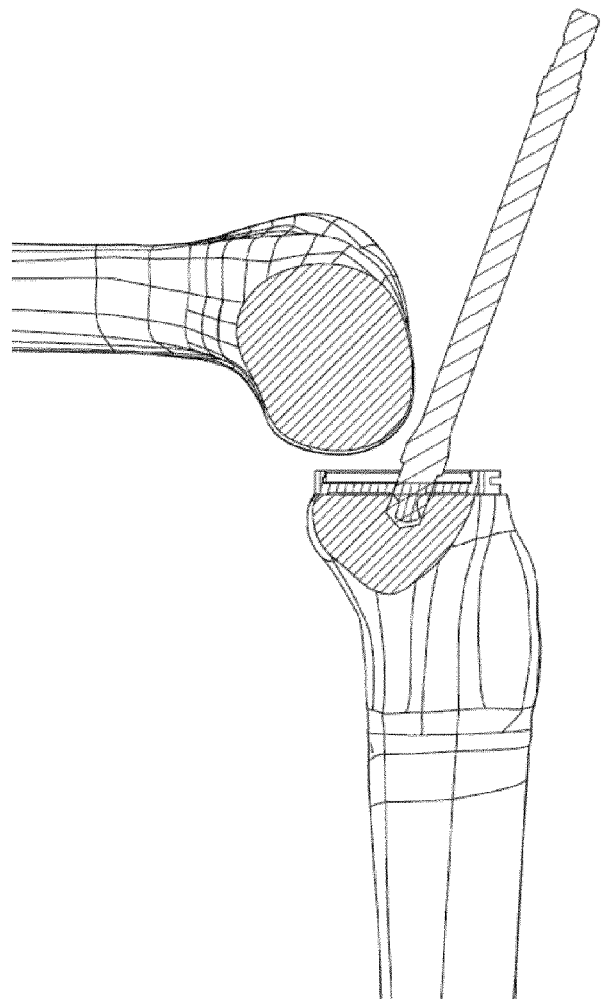
FIG. 1 shows a partial and lateral schematic view of an articulation involved by an orthopaedic surgery operation by an orthopaedic surgical instrument made according to the prior art.
Figure 2:
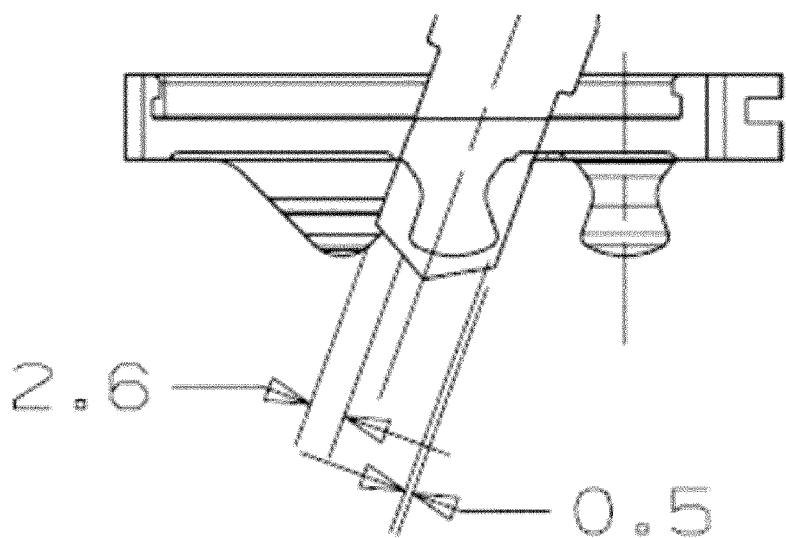
FIG. 2 shows, more in detail, a lateral and partial schematic view of the operating end of the orthopaedic surgical instrument of FIG. 1, always according to the prior art.
Figure 3:
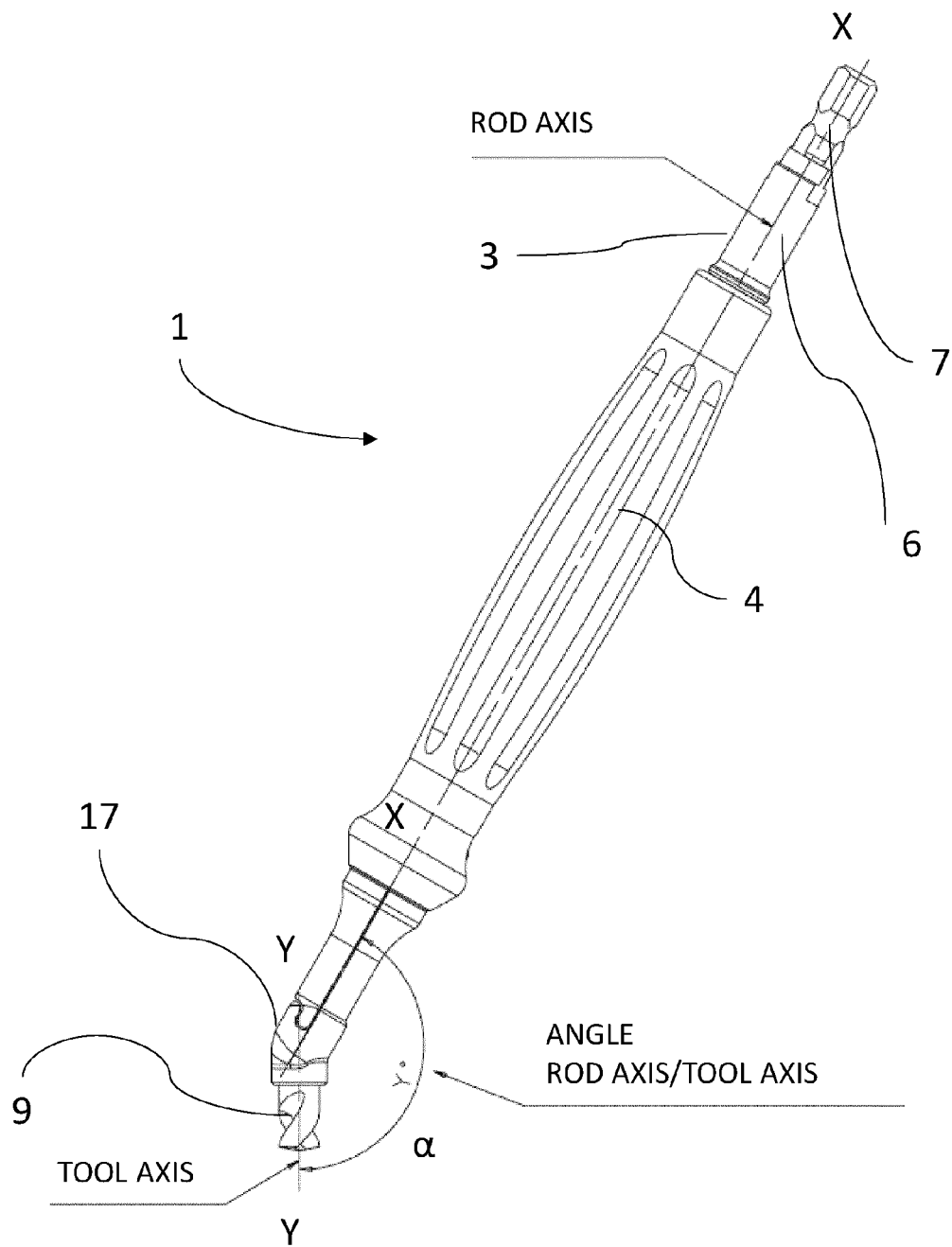
FIG. 3 shows a prospective and schematic view of an orthopaedic surgical instrument made according to the present invention.
Figure 4:
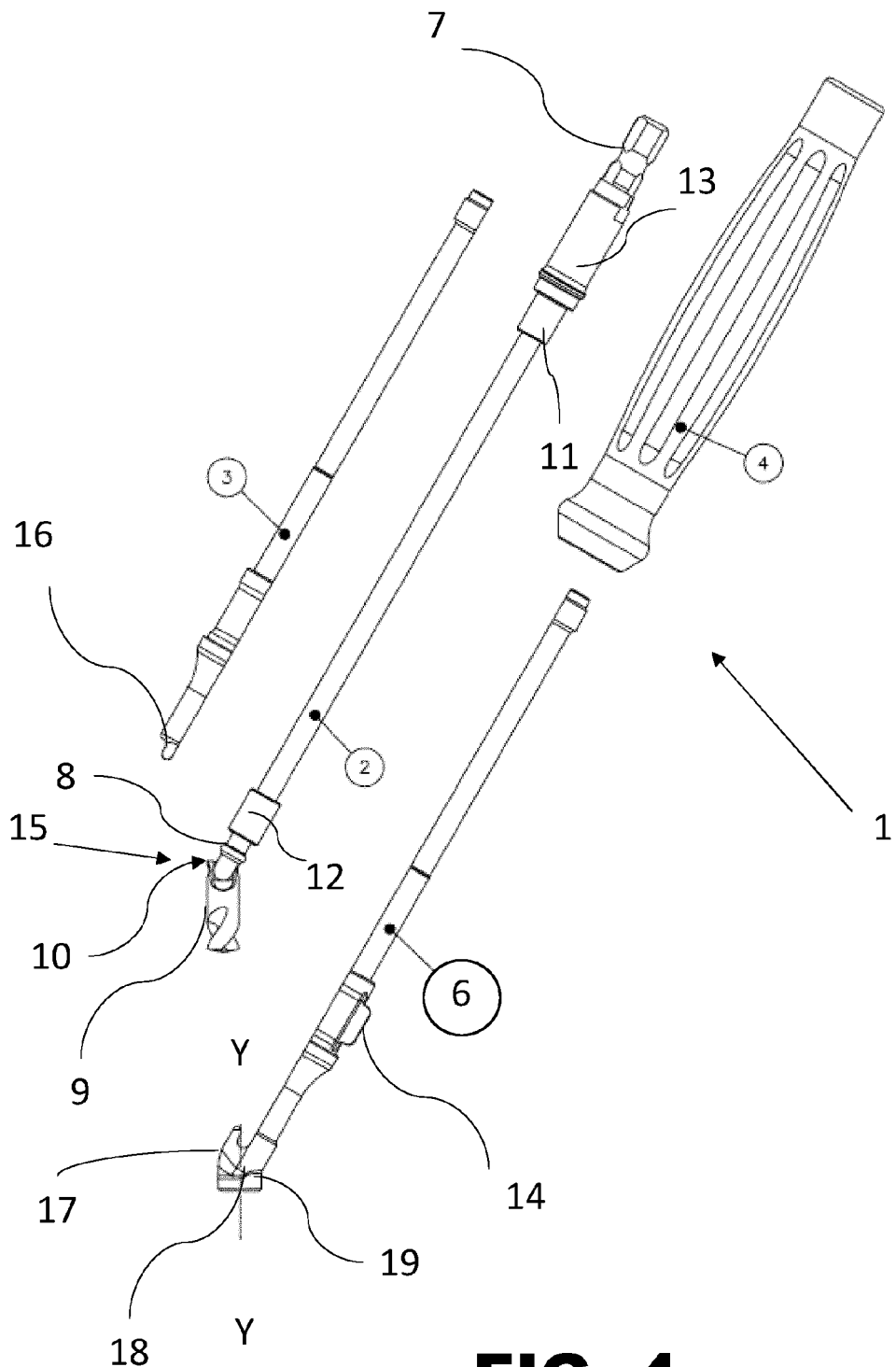
FIG. 4 shows another prospective and schematic view of the instrument of FIG. 2 shown in the main component parts thereof.
Figure 5:
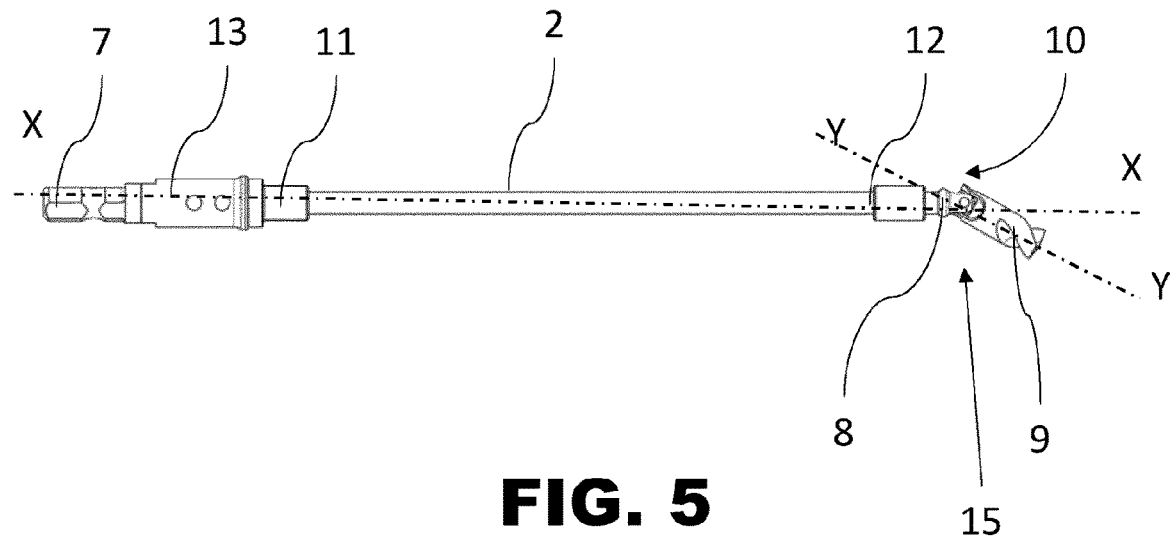
FIG. 5 shows a lateral schematic view of a component part of the instrument of FIG. 3.

With reference to the figures of the attached drawings, an orthopaedic surgical instrument and, more particularly, an improved milling cutter which can be used in knee, pelvis and ankle surgery, are globally and schematically shown with 1. The following description is made with reference to these specific fields of application with the only purpose of simplifying the exposition thereof without this representing a limitation of the Applicant's rights.

The milling cutter 1 comprises a main body of elongated shape with an inner rod 2 covered by a tubular, preferably cylindrical, envelope 5, formed by a first and a second half-shells 3, 6 and a handle 4 wrapping the most part of the tubular envelope 5.

The two half-shells 3, 6 are coupled to each other as two valves for forming the tubular envelope 5.

The handle 4 overlaps the tubular body 5 for at least two-thirds of the extension thereof.

The inner rod 2 is extended along a main and longitudinal axis X-X and has an end 7 shaped and configured as a quick-coupling attachment for a spindle (not shown) of a motorized member, for example a drill.

An opposite end 8 of the rod 2 is cinematically coupled and articulated to an operating head 15 of the milling cutter 1 which carries for example a perforating tool tip 9.

Advantageously, the inner rod 2 is idle with respect to the tubular envelope 5 and the handle 4. In other words, the rod 2 can be rotated by the coupling with the motorized member, while the handle intended for the orthopaedic surgeon is firmly held by the hand of the surgeon.

At least one pair of bushes 11, 12 is provided and mounted on opposite parts of the inner rod 2 for allowing the juxtaposition and mounting of the half-shells 3 and 6 to form a tubular envelope 5 which is later covered by the handle 4.

A first bush 11, which will be defined as proximal, is located on the part of the shaped end 7; this bush is free of moving along the rod 2 up to a predetermined distance from the end 7 defined by a spacer 13.

The other bush 12, which will be defined as distal, is always located on the same rod 2 near the end 8 coupled to the operating head 15.

The bushes are free of sliding along the rod 2 until the envelope 5 consists of the two half-shells 3 and 6; at that point, the bushes are housed in respective shaped seats 20, 21 of the envelope 5.

In a preferred, but not exclusive, embodiment, the two proximal and distal bushes 11 and 12 are made of a synthetic material, for example PEEK, in order to reduce the friction in the rotation of the rod 2 and guarantee the correct functioning of the cutter.

All the previously described parts composing the milling cutter 1 are easily removable and detachable from each other in order to ease the cleaning thereof.

Advantageously, according to the present invention, a gimbal joint 10 is provided between the rod end 8 and the tool 9 of the operating head 15 such that the tool 9 can be extended along an angled axis Y-Y with respect to the longitudinal axis X-X of the milling cutter 1.

Furthermore, a hosting seat 18 is provided for housing the gimbal joint 10 of the operating head 15.

This hosting seat 18 is substantially an open-guide-capsule angled body which houses a portion of the gimbal joint 10, for example the junction, such that the axis Y-Y of the tool tip 9 is oriented with a predetermined angular range "α" with respect to the extension axis X-X of the rod 2 of the milling cutter 1.

Figure 6:
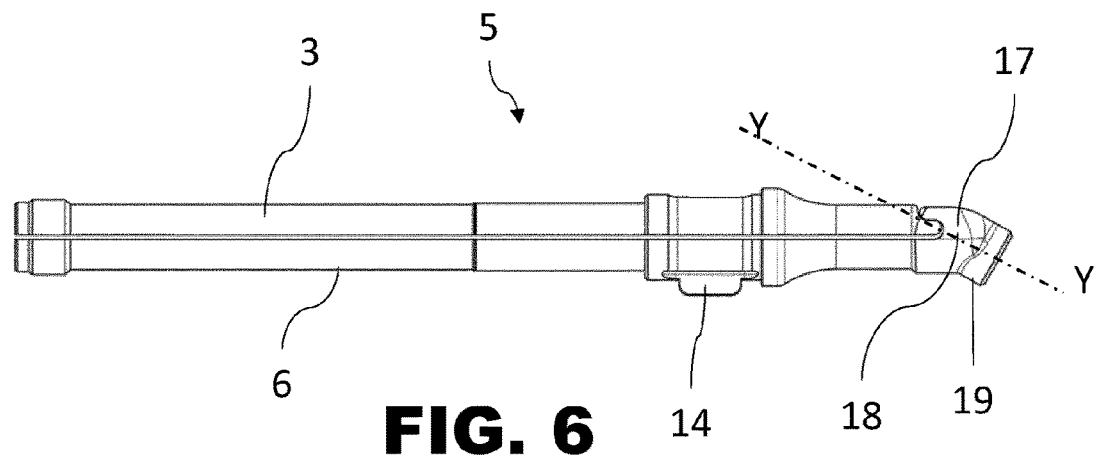
FIG. 6 shows a lateral schematic view of another component part of the instrument of FIG. 3.
Figure 7:
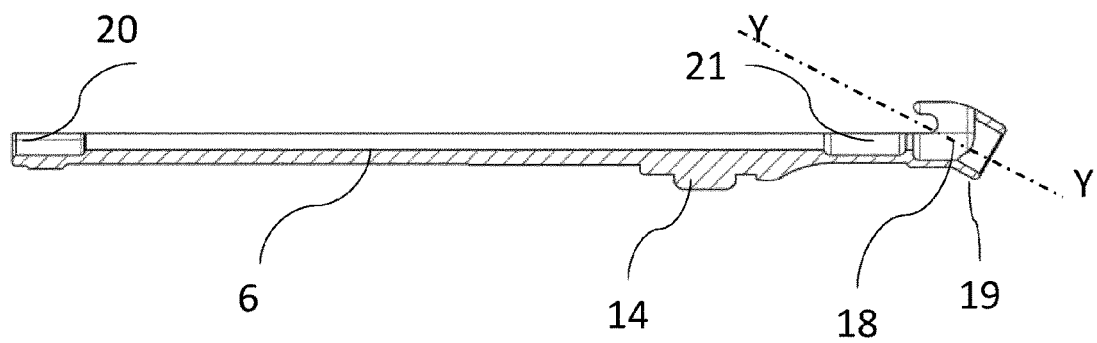
FIG. 7 shows a schematic lateral sectional view on a vertical plane of a portion of the component part of FIG. 6.
Figure 8:
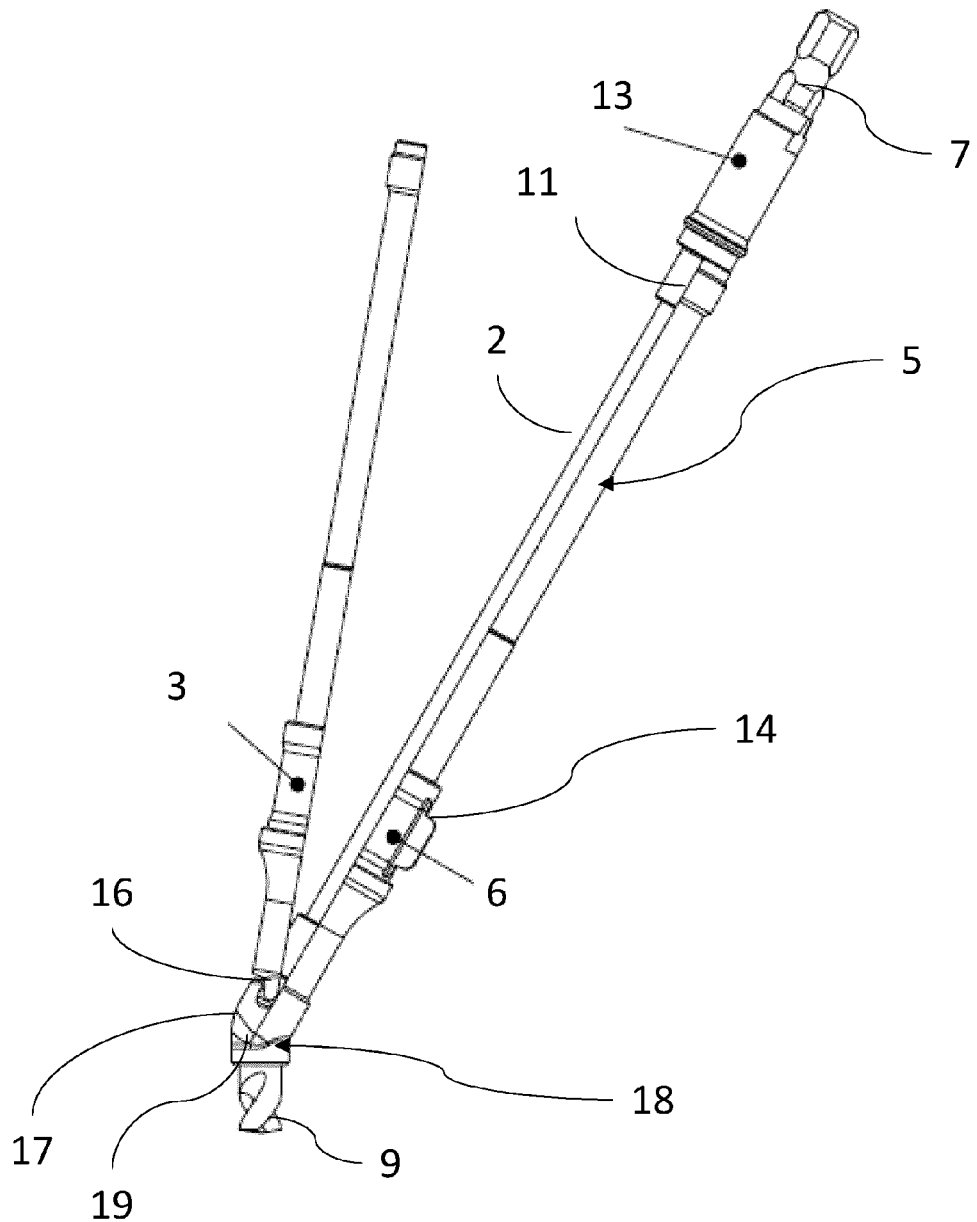
FIG. 8 shows a prospective and schematic view of the orthopaedic surgical instrument of the present invention in an assembled condition.

This hosting seat 18 is integrally formed at a distal end of only one of the two half-shells 3, 6 of the tubular envelope 5 covering the rod 2. More in particular, the hosting seat 18 housing the gimbal joint 10 is obtained at an end of the half-shell 6, as well shown in FIGS. 6 and 7.

The hosting seat 18 has an annular portion 19 having an axis corresponding with said angled axis Y-Y and which represents a guide for the angular orientation of the tool tip 9. Such annular portion has a diameter lightly higher than the one of the tool tip 9.

Therefore, a possible substitution of this single half-shell allows the inclination of the angle "α" subtended between the orientation of the two axis X-X of the rod 2 and Y-Y of the tool tip 9 to be modified.

Always at the distal end of such half-shell 6, in one piece with the hosting seat 18, a shield appendix 17 and a final configuration of the distal end of the tubular envelope 5 are obtained.

The other half-shell 3 has a distal end 16 partially pointed and form-fitted with the appendix 17 of the other half-shell.

At least one of the half-shells 3, 6 also comprises an anti-rotation element, for example a notch 14 projecting outwards in order to perform an anti-rotation function and to hold in position the handle 4 once the latter is mounted wrapping both half-shells 3, 6 of the tubular envelope 5. The notch 14 is preferably obtained on the half-shell 6 which also has the hosting seat 18 formed in one piece and is intended to be inserted in a corresponding slot inside the handle 4.

Recesses 20, 21 housing the pertaining bush portions 11 or 12 are provided in each of the half-shells 3,6.

Finally, it should be noted that the gimbal joint 10 connecting the rod 2 with the tip 9 has a part corresponding to the rod 2 end 8 and another part coupled to said tool 9. The part associated to the rod 2 end 8 can be formed in one piece with such end, while the other part can have a thread or a quick attachment for the removable mounting of the tool tip 9.

The milling cutter 1 according to the present invention achieves the predetermined objects and obtains various advantages, the first of which given by the fact that it makes possible the execution of holes with tip axis inclined, with a certain angle, with respect to the transmission axis of the motorized rod 2.

This angle "α" of the tool tip is particularly advantageous in the operating room in order to ease the access to the operation areas and to avoid possible contact areas between the instrument and the anatomical areas.

Figure 9:
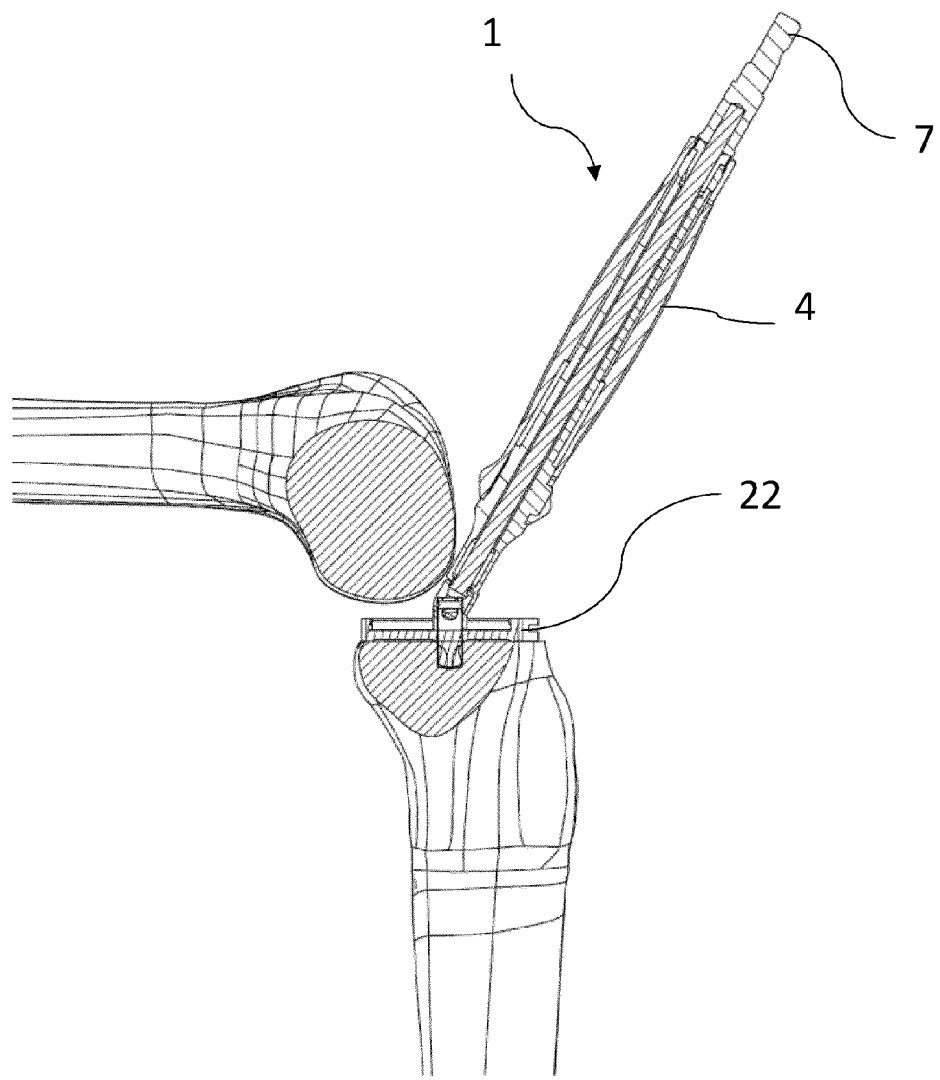
FIG. 9 shows a partial and lateral schematic view of an articulation involved by an orthopaedic surgical operation by the orthopaedic surgical instrument made according to the present invention.

The milling cutter according to the invention improves the precision of execution of the position of the holes in surgical operations with anatomy which is difficult to get access to and can be or not used together with a guide instrument 21 visible for example in FIG. 9.

The angled body of the hosting seat 18 determines the angle of inclination between tip 9 and axis X-X of the rod 2. This angle "α" can be changed by substituting the component 18, that is by substituting all the half-shell 6 of the envelope 5 which forms it.

For using the milling cutter 1 according to the invention, it is enough to mount the end 7 of the angled milling cutter 1 on a spindle of a motorized member, for example a drill.

The surgeon can firmly hold the handle present on the drill and the handle 4 of the angled milling cutter 1. The hole can be made with or without a guide element.

With reference to FIGS. 10 and 11, a further embodiment example of the instrument according to the invention is shown which was configured for an operation in the hip region, in particular for making holes for bone screws. Such screws often have an angle with respect to the access way made by the surgeon which requires angled or flexible instruments in order to achieve the desired direction for the screws.

The instrument of FIGS. 10 and 11 is indicated with the numeral 1'; for it, details and cooperating parts having the same structure and functioning of the previous embodiment are indicated with the same reference numbers.

A cup or test cup coupled to the instrument which is object of the invention is shown in figure. The arrangement of the holes 26 of the cup 25 is such as to make the access particularly difficult. Thanks to the instrument 1*i* with the gimbal joint 10 which allows the inclination of the tip 9 along an angled axis Y-Y with respect to the axis X-X of the instrument 1', it is possible to reach and align the tip 9 in all the holes of the cup 25.

Figure 13:
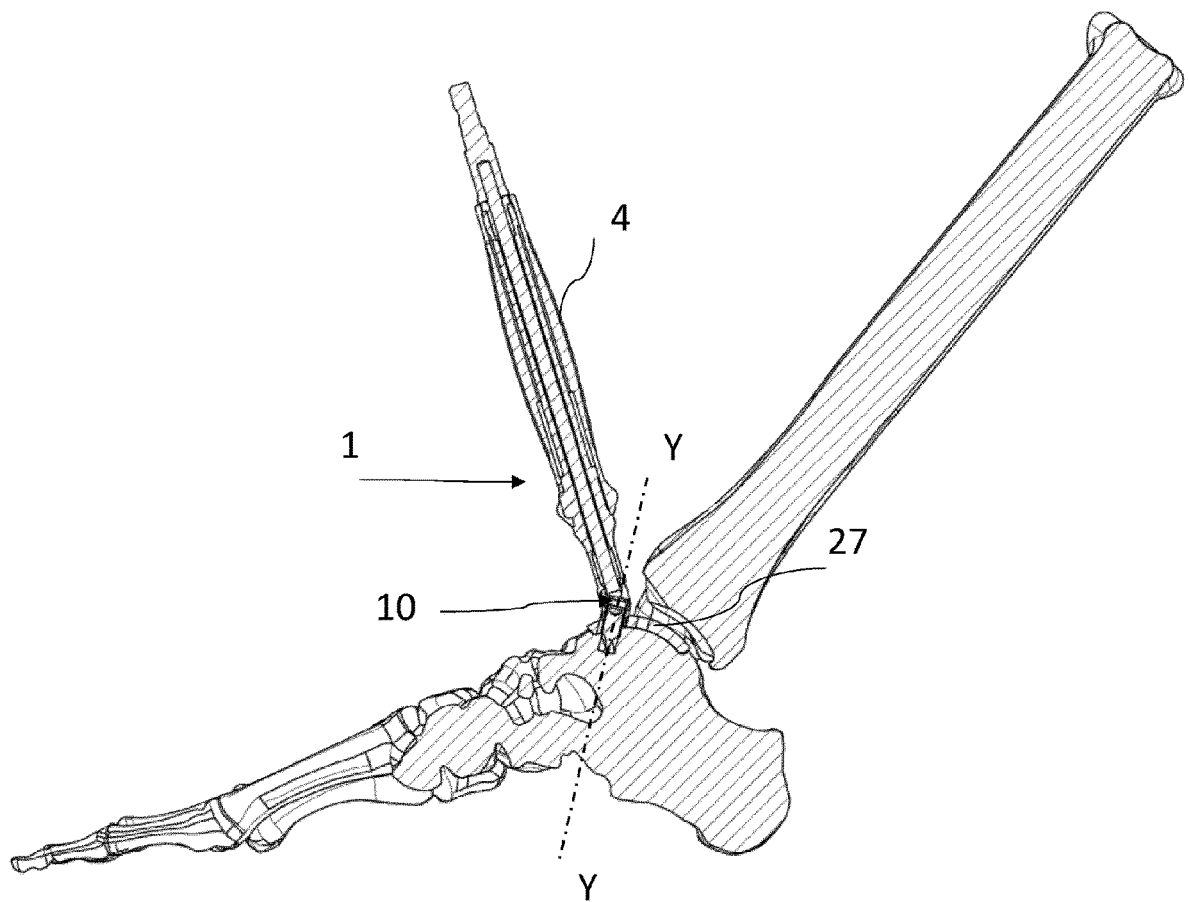

FIGS. 12 and 13 show respective further examples of application of the instrument 1 of the present invention for operations on the articulation of the ankle, in particular in the terminal part of the tibia and on the astragalus.

Also in these cases, as in the example of FIG. 11, a specific guide element 27 is used for the holes to be made by the milling cutter 1 which will be used for the later insertion of the bone pins.

From the figures, it is evident how the configuration of the angled milling cutter 1 allows an easier access to the areas to be milled, greatly reducing the times of operation or preparation for later orthopaedic surgery operations.

In understanding the scope of the present invention, the term "comprising" and derivatives thereof, as used herein, are intended as open terms which specify the presence of the specified features, elements, components, groups, integers and/or steps, but they do not exclude the presence of other unspecified characteristics, elements, components, groups, integers and/or steps. The foregoing also applies to words having similar meanings such as the terms, "including", "having" and derivatives thereof. Furthermore, the terms "part", "section", "portion", "member" or "element" when used in the singular form can have the double meaning of a single part or a plurality of parts unless otherwise specified.

It will also be understood that although the terms "first" and "second" or "half" may be used herein to describe various components, these components should not be limited by these terms. These terms are used only to distinguish one component from another.

Although only selected embodiments have been chosen to illustrate the present invention, it will be clear to those skilled in the art from this disclosure that various changes and modifications can be made herein without departing from the scope of the invention as defined in the attached claims.

What is claimed is:

1. Orthopaedic surgical instrument, comprising:
   an inner rod extended along an own longitudinal axis and provided with an attachment end to a motorized member;
   a tubular envelope wrapping the inner rod;
   an operating head at a rod end which is opposite said attachment end; and a gimbal joint between the rod end and a tool of said operating head such that said tool is extended along an angled axis with respect to said longitudinal axis,
said tubular envelope being structured with two overlapped half-shells covered by a handle and that at least one of them comprises an anti-rotation element for holding such handle wrapping both half-shells.

2. Surgical instrument according to claim 1, wherein said inner rod is idle with respect to said tubular envelope.

3. Surgical instrument according to claim 1, comprising at least one pair of bushes mounted in an idle manner on opposite parts of said inner rod for supporting said tubular envelope.

4. Surgical instrument according to claim 3, wherein said bushes are made of a low-friction synthetic material, for example PEEK.

5. Surgical instrument according to claim 1, wherein said tubular envelope is structured with the two overlapped half-shells, at one end of one of them a hosting seat being provided for housing the gimbal joint of said operating head.

6. Surgical instrument according to claim 5, wherein said hosting seat has an annular portion having an axis corresponding with said angled axis.

7. Surgical instrument according to claim 1, wherein said anti-rotation element is an anti-rotation projecting notch for holding the handle wrapping both half-shells of the tubular envelope.

8. Surgical instrument according to claim 1, wherein said gimbal joint has one part corresponding to said rod end and another part removably coupled with said tool.

9. Surgical instrument according to claim 1, wherein said attachment end is shaped as a quick-coupling attachment for a spindle of said motorized member.

10. Orthopaedic surgical instrument, comprising:
an inner rod having a longitudinal axis and with one end structured to be coupled to a motorized member;
a tubular envelope wrapping the inner rod and structured with two overlapped half-shells covered by a handle;
an angled operating head including a tool; and
a gimbal joint provided between the rod end and the tool of said operating head;
an anti-rotation element provided in one of the overlapping half-shells for performing an anti-rotation function holding in position the handle wrapping both half-shells.

11. Surgical instrument according to claim 10, wherein said inner rod is idle with respect to said tubular envelope.

12. Surgical instrument according to claim 10, comprising at least one pair of bushes mounted in an idle manner on opposite parts of said inner rod for supporting said tubular envelope.

13. Surgical instrument according to claim 12, wherein said bushes are made of a low-friction synthetic material, for example PEEK.

14. Surgical instrument according to claim 10, wherein said tubular envelope is structured with the two overlapped half-shells, at one end of one of them a hosting seat being provided for housing the gimbal joint of said operating head.

15. Surgical instrument according to claim 14, wherein said tool is extended along an angled axis with respect to said longitudinal axis; and said hosting seat has an annular portion having an axis corresponding with said angled axis.

16. Surgical instrument according to claim 10, wherein said anti-rotation element is an anti-rotation projecting notch for holding the handle wrapping both half-shells of the tubular envelope.

17. Surgical instrument according to claim 10, wherein said gimbal joint has one part corresponding to said rod end and another part removably coupled with said tool.

18. Surgical instrument according to claim 10, wherein the inner rod is provided with an attachment end; and said attachment end is shaped as a quick-coupling attachment for a spindle of said motorized member.

* * * * *